US009868487B2

(12) United States Patent
Okaniwa et al.

(10) Patent No.: US 9,868,487 B2
(45) Date of Patent: Jan. 16, 2018

(54) ROUTING STRUCTURE FOR BRAKING FORCE-TRANSMITTING MEMBER IN MOTORCYCLE (71) Applicant: HONDA MOTOR CO., LTD., Minato-Ku, Tokyo (JP)

(72) Inventors: Takeshi Okaniwa, Wako (JP); Koji Kobayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/121,119

(22) PCT Filed: Feb. 9, 2015

(86) PCT No.: PCT/JP2015/053485
§ 371 (c)(1),
(2) Date: Aug. 24, 2016

(87) PCT Pub. No.: WO2015/129439
PCT Pub. Date: Sep. 3, 2015

(65) Prior Publication Data
US 2017/0015383 A1    Jan. 19, 2017

(30) Foreign Application Priority Data

Feb. 26, 2014  (JP) ................................ 2014-034985

(51) Int. Cl.
*B62K 19/38* (2006.01)
*B62H 1/02* (2006.01)
(Continued)

(52) U.S. Cl.
CPC ............. *B62K 19/38* (2013.01); *B62H 1/02* (2013.01); *B62J 11/00* (2013.01); *B62K 11/10* (2013.01); *B62L 3/02* (2013.01)

(58) Field of Classification Search
CPC ... B62J 11/00; B62H 1/00; B62H 1/02; B62K 11/10; B62K 19/38; B62L 3/00; B62M 7/08; A47F 5/08; A47F 5/14
(Continued)

(56) References Cited

U.S. PATENT DOCUMENTS

2004/0031632 A1 * 2/2004 Kohda ..................... B60K 1/04
                                                               180/68.5
2007/0084654 A1 * 4/2007 Kobayashi ............... B62J 11/00
                                                                224/413
(Continued)

FOREIGN PATENT DOCUMENTS

JP      H05-16864 A      1/1993
JP      07069255 A  *   3/1995 ............... B62H 1/04
(Continued)

OTHER PUBLICATIONS

Extended European search report dated Nov. 10, 2017 issued over the corresponding EP Patent Application 15756009.5.

*Primary Examiner* — Joseph M Rocca
*Assistant Examiner* — Daniel S Yeagley
(74) *Attorney, Agent, or Firm* — Carrier Blackman & Associates, P.C.; Joseph P. Carrier; William D. Blackman (57) ABSTRACT Provided is a routing structure for a braking force-transmitting member in a motorcycle in which a front part of a unit-swing engine supporting a rear wheel is supported on a vehicle body frame via a link mechanism, and the braking force-transmitting member is routed to extend in the fore-and-aft direction so as to transmit a braking force to a rear wheel brake disposed coaxially with the rear wheel, wherein the link mechanism includes a first link linked to the vehicle body frame and a second link linked to the unit-swing engine while having an engine suspension boss portion pivotably linked to the first link, and a guide member retaining the braking force-transmitting member extending in the fore-
(Continued)

and-aft direction beneath the unit-swing engine is mounted on the second link. This can suppress swinging of a braking force-transmitting member and enables the mass around the braking force-transmitting member to be concentrated.

5 Claims, 7 Drawing Sheets (51) Int. Cl.
*B62K 11/10* (2006.01)
*B62J 11/00* (2006.01)
*B62L 3/02* (2006.01)

(58) Field of Classification Search
USPC ....... 224/440, 441, 447, 449, 450, 451, 458, 224/459, 419, 224
See application file for complete search history.

(56) References Cited

U.S. PATENT DOCUMENTS

2007/0200315 A1* 8/2007 Ogawa .................. B62H 1/02
280/293
2008/0079310 A1* 4/2008 Yamakura ............ B60T 8/3225
303/115.4

FOREIGN PATENT DOCUMENTS

| JP | H08-326927 A | 12/1996 |
|----|--------------|---------|
| JP | 2007-099271 A | 4/2007 |
| JP | 2012-166582 A | 9/2012 |
| JP | 2012-187960 A | 10/2012 |
| JP | 2012-188068 A | 10/2012 |
| JP | 2014162409 A * | 9/2014 |

* cited by examiner

ROUTING STRUCTURE FOR BRAKING FORCE-TRANSMITTING MEMBER IN MOTORCYCLE

TECHNICAL FIELD

The present invention relates to a motorcycle in which a unit-swing engine extending in a fore-and-aft direction so as to axially support a rear wheel via a rear part thereof has a front part swingably supported on a vehicle body frame via a link mechanism, and a braking force-transmitting member for transmitting a braking force to a rear wheel brake disposed coaxially with the rear wheel so as to brake the rear wheel is routed so as to extend in the fore-and-aft direction and, in particular, to an improvement of a routing structure for the braking force-transmitting member.

BACKGROUND ART

An arrangement in which a bracket is mounted on a rear part of a transmission case of a unit-swing engine swingably supported on a vehicle body frame, and a guide member retaining a brake hose, which is a braking force-transmitting member for transmitting a braking force to a rear wheel brake, is mounted on the bracket is known from Patent Document 1.

RELATED ART DOCUMENTS

Patent Documents

Patent Document 1: Japanese Patent Application Laid-open No. 2007-99271

SUMMARY OF THE INVENTION

Problems to be Solved by the Invention

A unit-swing engine is one that swings, and as in one disclosed in Patent Document 1 above, in a structure in which a guide member retaining a braking force-transmitting member is mounted on a bracket mounted on a rear part of a unit-swing engine, the amount of swing of the braking force-transmitting member is large, it is necessary to determine the layout of components around the braking force-transmitting member while taking into consideration the amount of swing of the braking force-transmitting member, and restrictions are imposed on the degree of freedom in the layout of components around the braking force-transmitting member.

The present invention has been accomplished in light of such circumstances, and it is an object thereof to provide a routing structure for a braking force-transmitting member in a motorcycle that can suppress swinging of a braking force-transmitting member and enables the mass around the braking force-transmitting member to be concentrated.

Means for Solving the Problems

In order to attain the above object, according to a first aspect of the present invention, there is provided a routing structure for a braking force-transmitting member in a motorcycle in which a unit-swing engine extending in a fore-and-aft direction so as to axially support a rear wheel via a rear part thereof has a front part swingably supported on a vehicle body frame via a link mechanism, and a braking force-transmitting member for transmitting a braking force to a rear wheel brake disposed coaxially with the rear wheel so as to brake the rear wheel is routed so as to extend in the fore-and-aft direction, characterized in that the link mechanism comprises a first link linked to the vehicle body frame and a second link linked to the unit-swing engine while having an engine suspension boss portion pivotably linked to the first link, and a guide member retaining the braking force-transmitting member extending in the fore-and-aft direction beneath the unit-swing engine is mounted on the second link.

Further, according to a second aspect of the present invention, in addition to the first aspect, a center stand is pivotably supported on the second link, and an elastic spring urging the center stand toward a retracted position side is provided between the center stand and a support shaft provided on the second link so as to support the guide member.

According to a third aspect of the present invention, in addition to the first or second aspect, the unit-swing engine comprises an engine main body and a transmission case provided so as to be connected to the engine main body and extending rearward, and a cooling duct for introducing cooling air into an interior of the transmission case is disposed above the guide member and the braking force-transmitting member retained by the guide member when viewed from a side.

According to a fourth aspect of the present invention, in addition to any one of the first to third aspects, the guide member is formed so as to comprise a first insertion portion through which the braking force-transmitting member is inserted and retained and a second insertion portion through which a drain tube is inserted and retained, the drain tube (59, 60) guiding water drained from auxiliary equipment mounted on the motorcycle.

Furthermore, according to a fifth aspect of the present invention, in addition to the fourth aspect, the first insertion portion is formed so as to open in a vehicle width direction when viewed from the side in a state in which the guide member is mounted on the second link and so that an opening area thereof is a maximum in an oblique direction and a minimum when viewed from a rear.

Effects of the Invention

In accordance with the first aspect of the present invention, since the braking force-transmitting member linked to the rear wheel brake disposed coaxially with the rear wheel is retained by the guide member mounted on the second link linked to the unit-swing engine while having the engine suspension boss portion of the link mechanism provided between the vehicle body frame and the front part of the unit-swing engine, it is possible to dispose the guide member in the vicinity of the engine suspension boss portion, which is the anchor point for swinging of the unit-swing engine, it is possible to suppress swinging of the braking force-transmitting member linked to the rear wheel brake disposed coaxially with the rear wheel, it is possible to dispose components around the braking force-transmitting member close to the braking force-transmitting member, and concentration of mass around the braking force-transmitting member can be achieved.

Furthermore, in accordance with the second aspect of the present invention, since the elastic spring urging the center stand pivotably supported on the second link toward the retracted position side is provided between the center stand and the support shaft provided on the second link so as to support the guide member, it is possible to dispose the center stand close to the braking force-transmitting member, thus enabling a further concentration of mass to be achieved.

In accordance with the third aspect of the present invention, since when viewed from the side the braking force-transmitting member is present beneath the cooling duct, which introduces cooling air into the interior of the transmission case of the unit-swing engine, while avoiding passage of the braking force-transmitting member through the side of the cooling duct, it is possible to achieve a further concentration of mass and shorten the braking force-transmitting member.

In accordance with the fourth aspect of the present invention, since the guide member has the first and second insertion portions, the braking force-transmitting member is inserted through and retained by the first insertion portion, and the drain tube is inserted through and retained by the second insertion portion, it is unnecessary to employ a member exclusively used for retaining the drain tube, thus avoiding any increase in the number of components and achieving a further concentration of mass.

In accordance with the fifth aspect of the present invention, the opening area of the first insertion portion becomes a minimum when viewed from the rear in a state in which the guide member is mounted on the second link while enabling the braking force-transmitting member to be inserted through the first insertion portion in a state in which an elastic member such as a grommet is fitted thereinto, and in a state in which the guide member is mounted on the second link the braking force-transmitting member can be inserted through and retained by the first insertion portion together with the elastic member, thereby enhancing the efficiency of the mounting operation.

EXPLANATION OF REFERENCE NUMERALS AND SYMBOLS

18 Link mechanism
20 Storage box, which is auxiliary equipment
21 Fuel tank, which is auxiliary equipment
28 Engine main body
29 Transmission case
32 Cooling duct
41 First link
42 Second link
42a Engine suspension boss portion
44 Center stand
46 Elastic spring
47 Support shaft
50 Brake cable, which is a braking force-transmitting member
52 Guide member
53a First insertion portion 54c Second insertion portion
59, 60 Drain tube
BR Rear wheel brake
F Vehicle body frame
UE Unit-swing engine
WR Rear wheel

MODE FOR CARRYING OUT THE INVENTION

An embodiment of the present invention is explained by reference to the attached FIG. 1 to FIG. 7. In the explanation below, front and rear, left and right, and upper and lower refer to directions as viewed by a person riding a motorcycle.

First Embodiment

Figure 1:
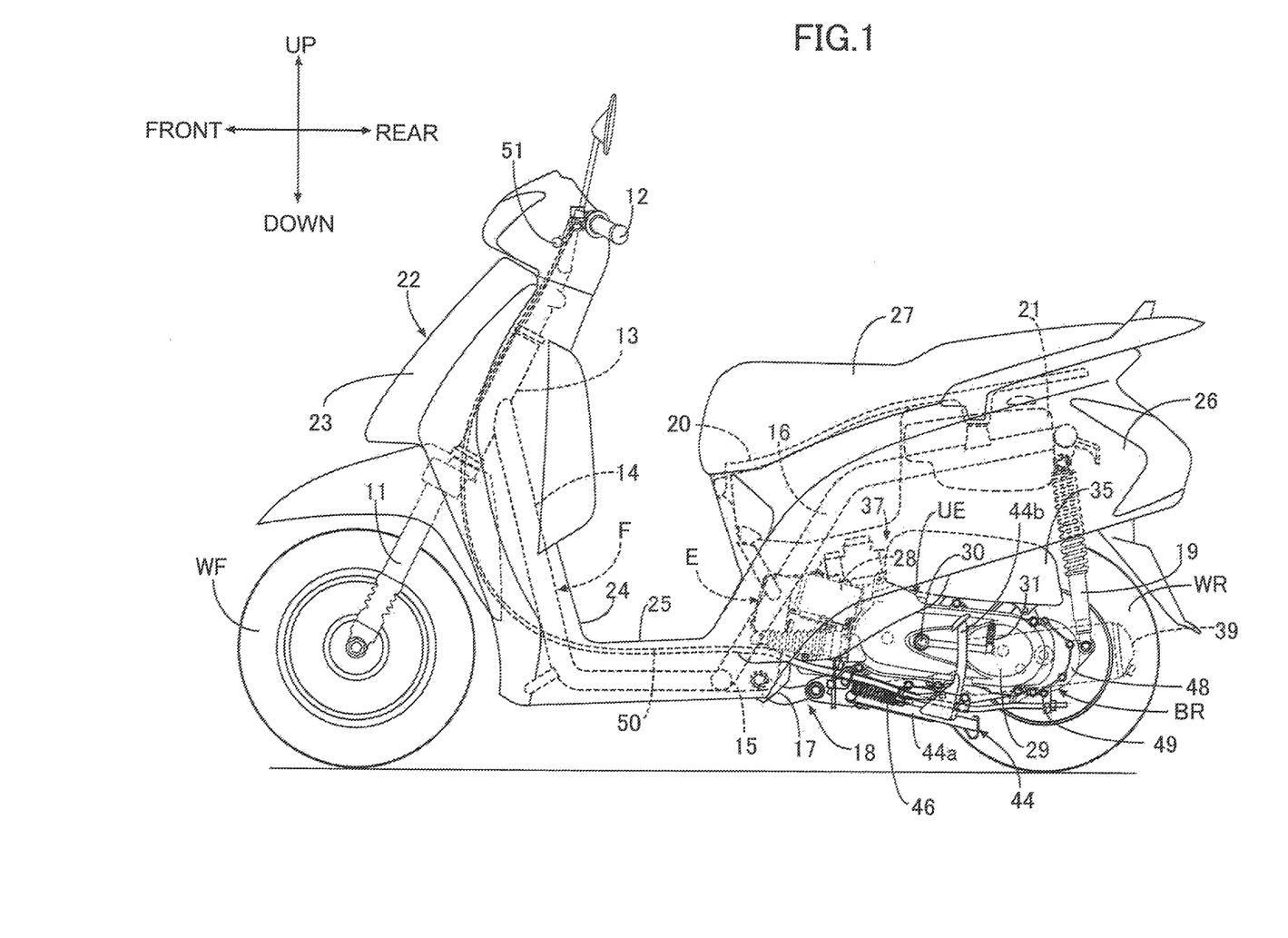
FIG. 1 is a left side view of a motorcycle. (first embodiment)

First, in FIG. 1, a vehicle body frame F of a scooter type motorcycle includes a head pipe 13 steerably supporting a front fork 11 axially supporting a front wheel WF and handlebars 12 linked to the front fork 11, a down tube 14 extending downward to the rear from the head pipe 13, a cross member 15 extending in the vehicle width direction and fixed to the rear end of the down tube 14, and a pair of left and right rear frame pipes 16 having their front ends fixed to left and right opposite sides of the cross member 15 and extending upward to the rear.

A bracket 17 is provided on a front end part of the two rear frame pipes 16 of the vehicle body frame F. Swingably supported on the bracket 17 via a link mechanism 18 is a front part of a unit-swing engine UE, and axially supported on a rear part of the unit-swing engine UE is a rear wheel WR disposed on the rear right side of the unit-swing engine UE. A rear cushion unit 19 is provided between rear parts of the unit-swing engine UE and, among the two rear frame pipes 16, the left rear frame pipe 16.

A storage box 20 is disposed above the unit-swing engine UE, a fuel tank 21 is disposed to the rear of the storage box 20, and the storage box 20 and the fuel tank 21 are supported by the rear frame pipe 16.

The vehicle body frame F is covered by a synthetic resin vehicle body cover 22, this vehicle body cover 22 including a front cover 23 covering the head pipe 13 from the front, a leg visor shield 24 connected to the front cover 23 so as to cover the front of the legs of a driver, a step floor 25 connected to a lower part of the leg visor shield 24 for the feet of a rider to be placed on, and a side cover 26 connected to the step floor 25 so as to cover a rear part of the vehicle body from opposite sides. A tandem type riding seat 27 is provided on the side cover 26, the tandem type riding seat 27 covering the storage box 20 and the fuel tank 21 from above so that it can be opened and closed.

Figure 2:
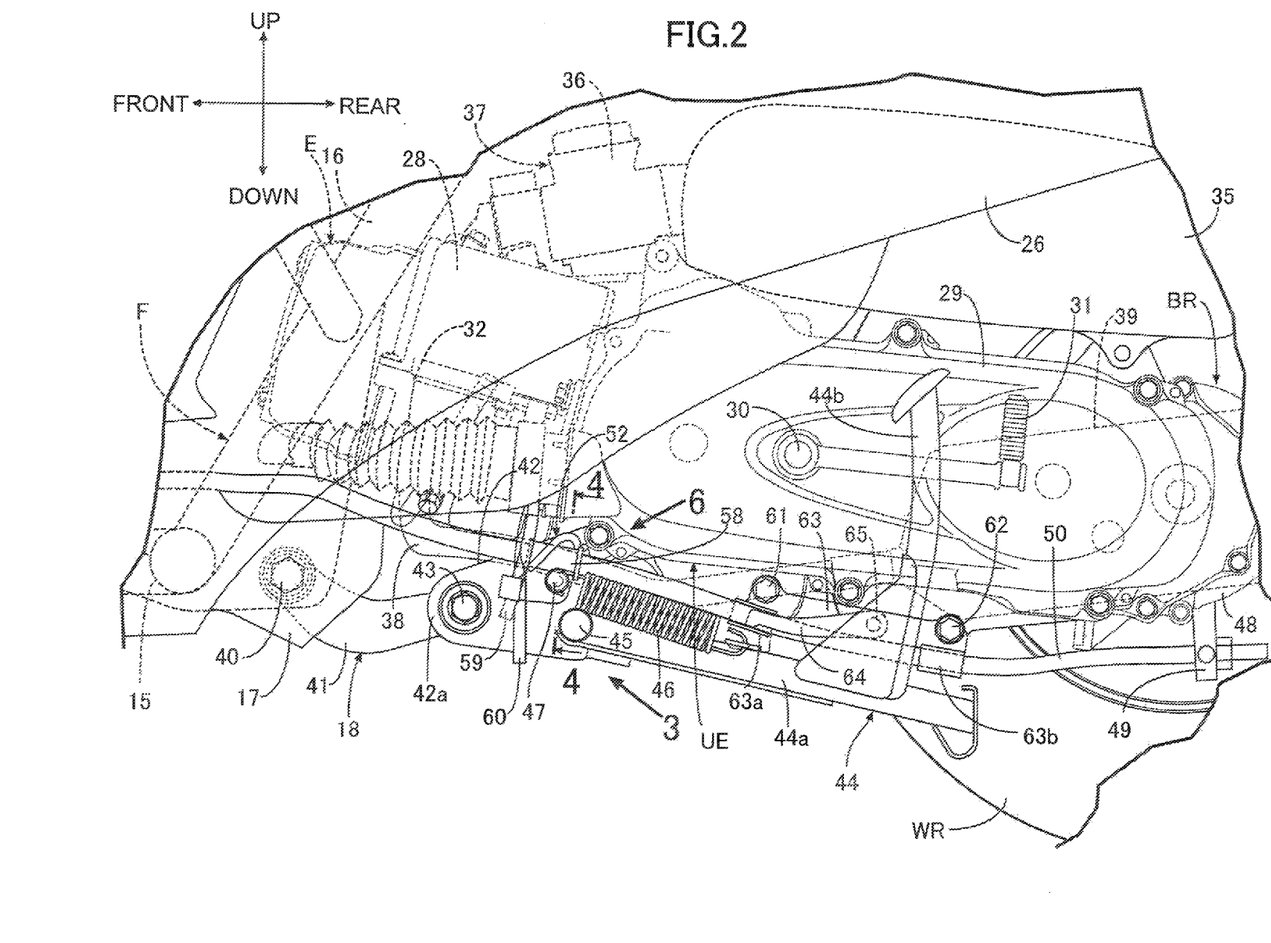
FIG. 2 is an enlarged view of an essential part of FIG. 1. (first embodiment)
Figure 3:
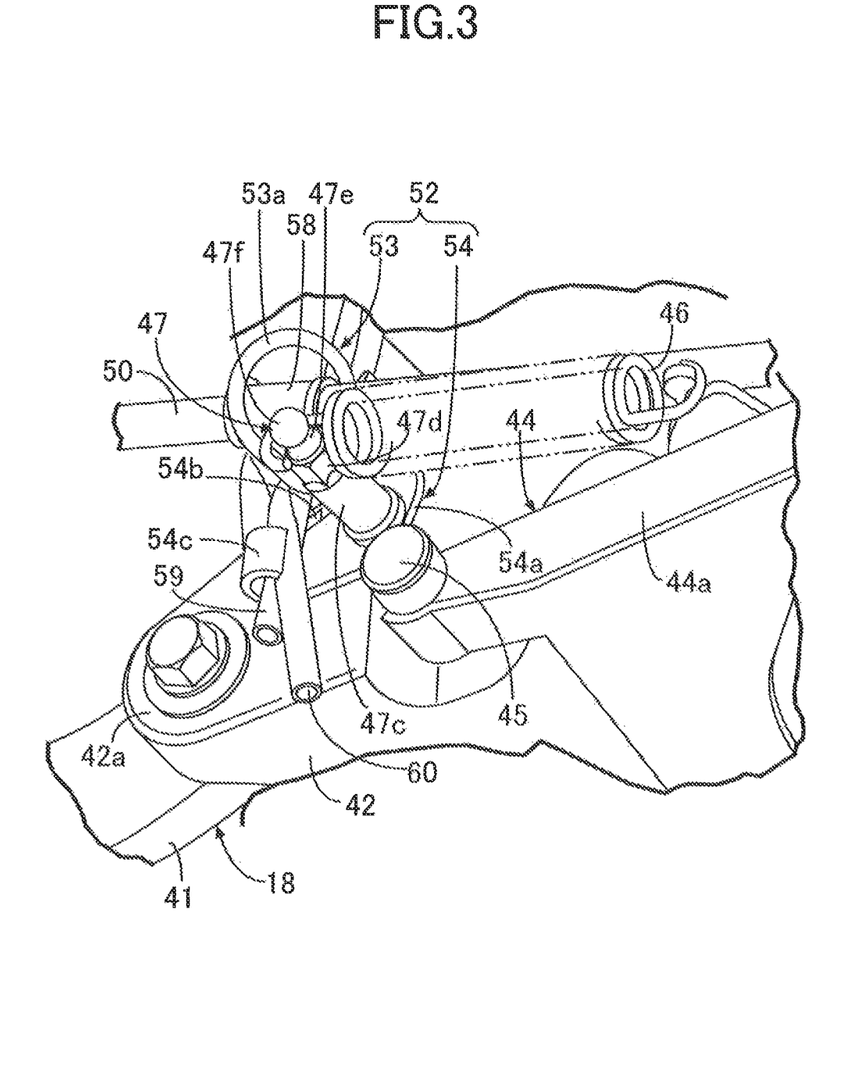
FIG. 3 is a perspective view of an essential part of FIG. 2 in the direction of arrow 3 in FIG. 2. (first embodiment)
Figure 4:
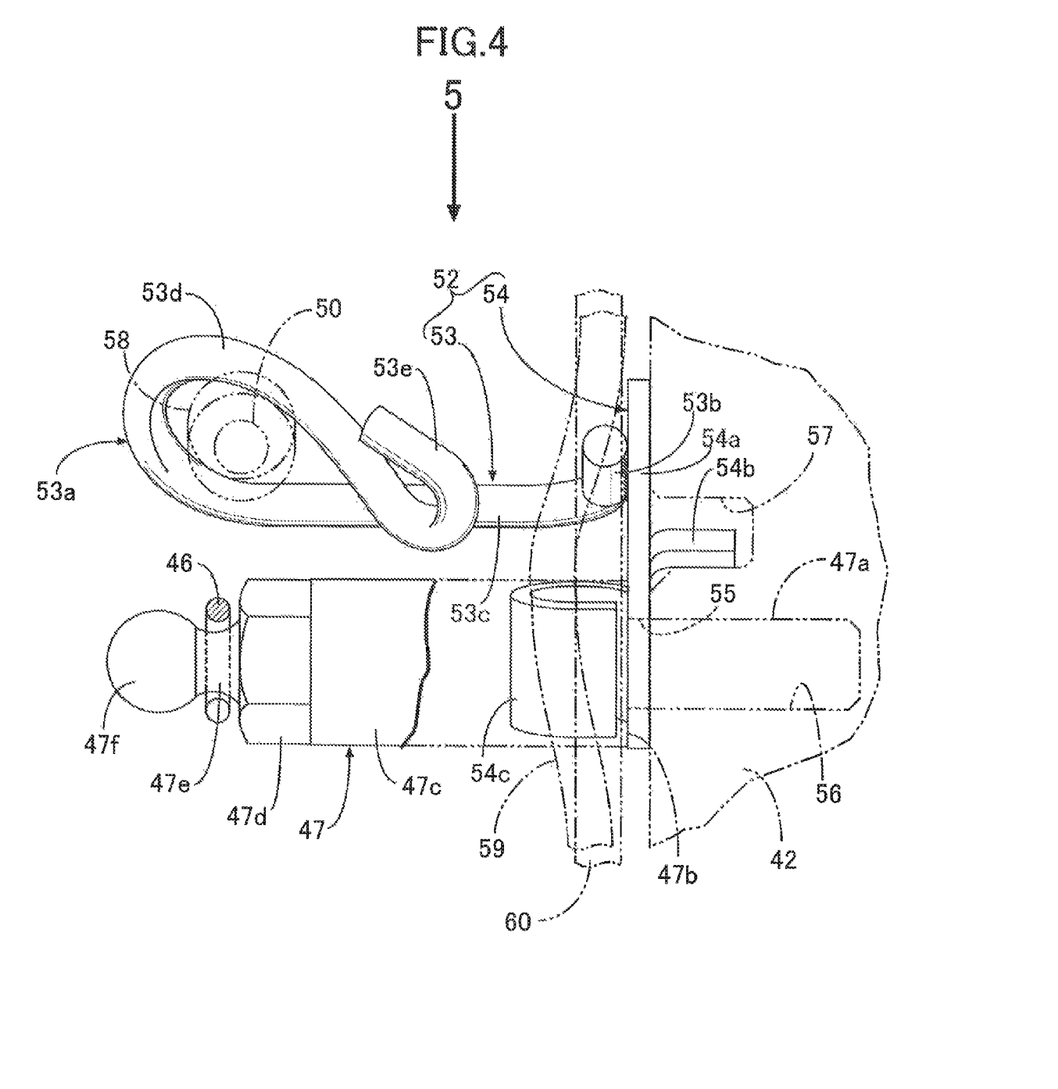
FIG. 4 is a view of a guide member in the direction of arrowed line 4-4 in FIG. 2. (first embodiment)
Figure 5:
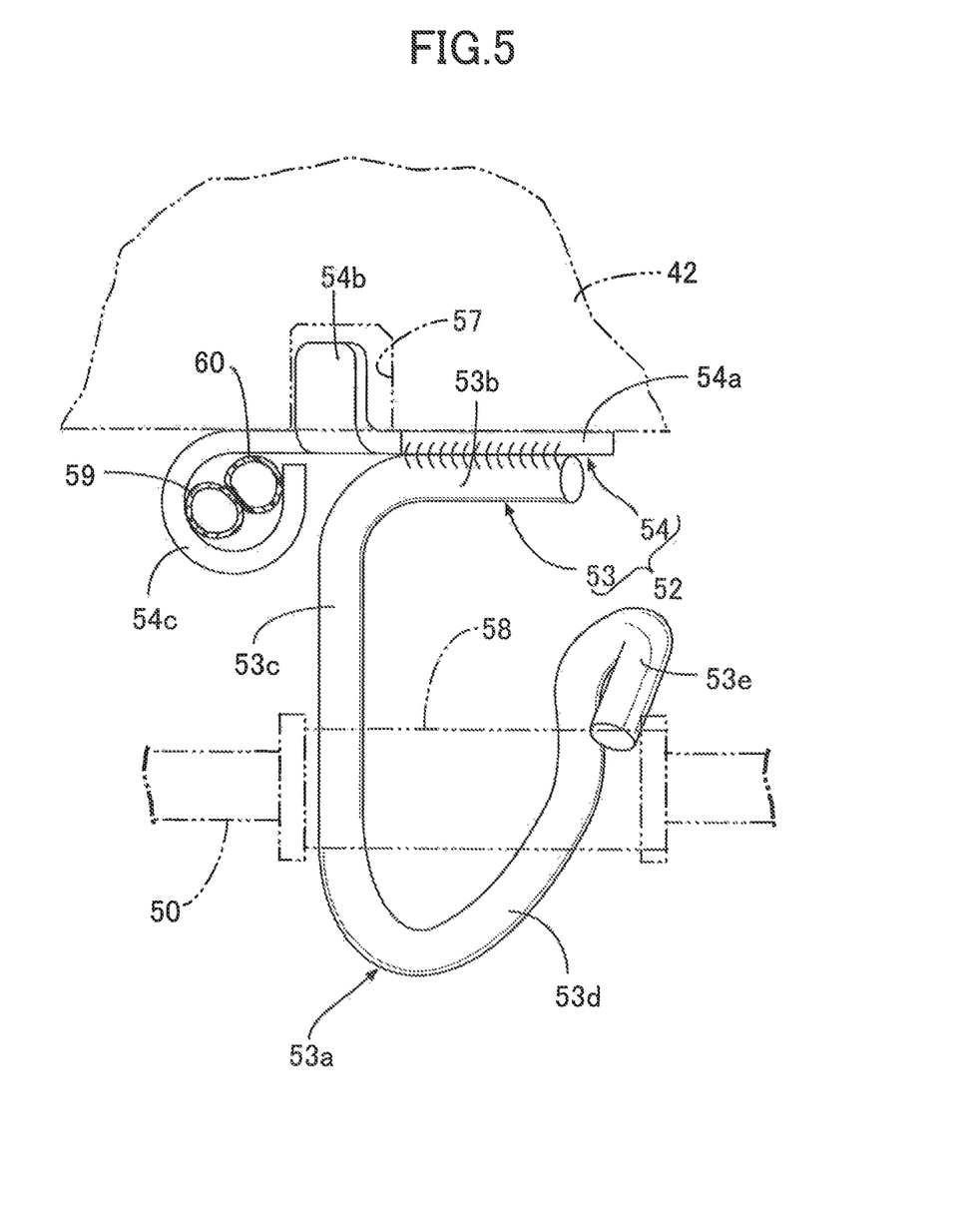
FIG. 5 is a view in the direction of arrow 5 in FIG. 4. (first embodiment)
Figure 6:
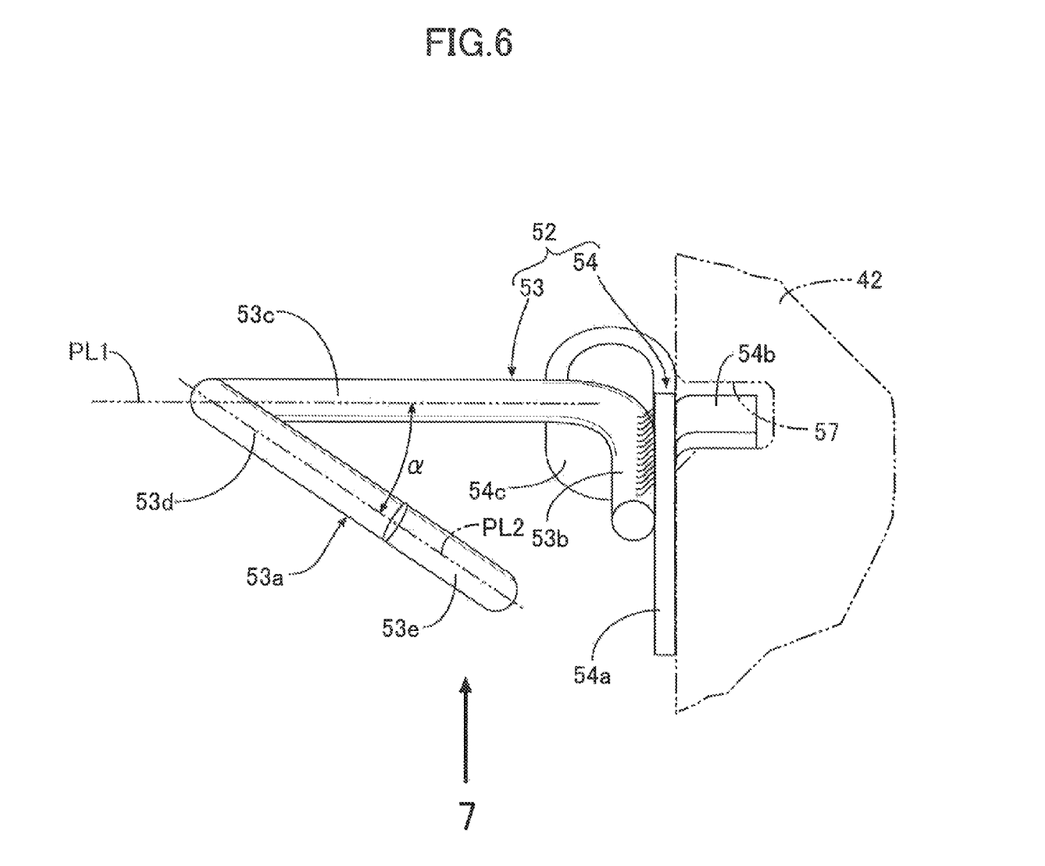
FIG. 6 is a view of the guide member in the direction of arrow 6 in FIG. 2. (first embodiment)
Figure 7:
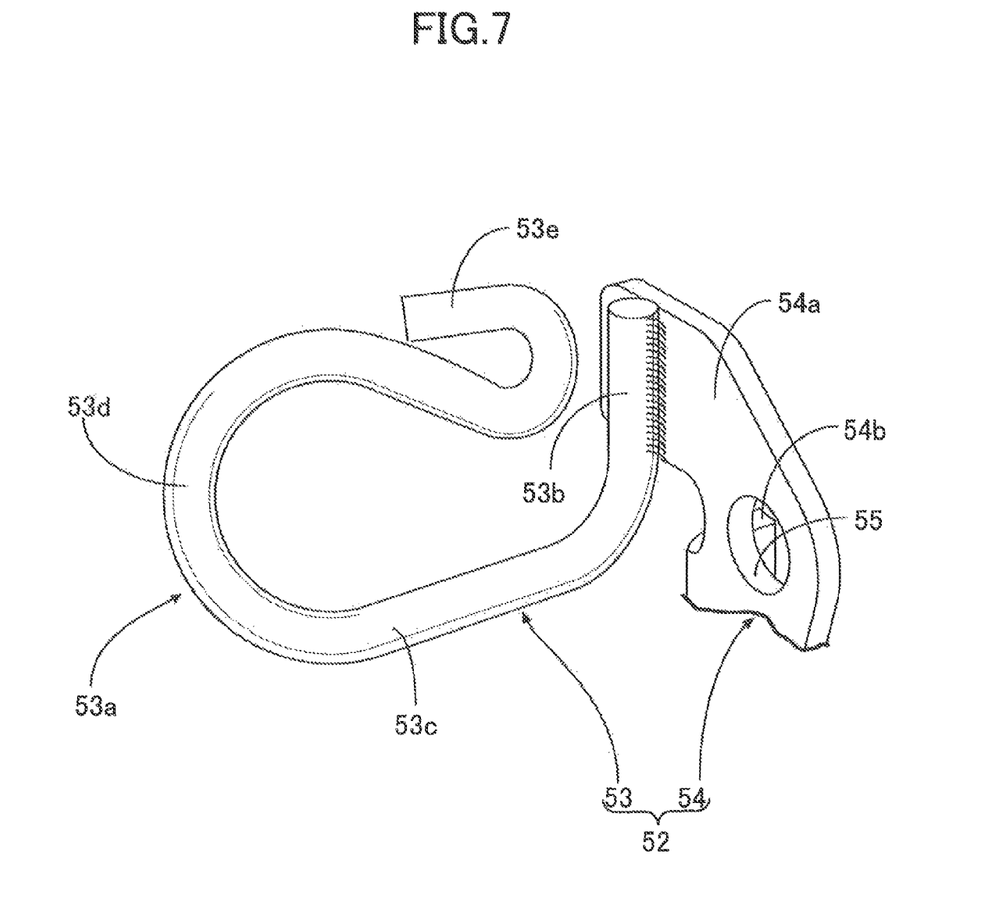
FIG. 7 is a view in the direction of arrow 7 in FIG. 6. (first embodiment)

In FIG. 2, the unit-swing engine UE is formed from a four-cycle forced air-cooled single-cylinder OHC type engine E disposed in front of the rear wheel WR and a transmission (not illustrated) provided between the engine E and the rear wheel WR.

The unit-swing engine UE includes an engine main body 28 of the engine E, and a transmission case 29 housing the transmission, extending rearward from the engine main body 28, and disposed on the left side of the rear wheel WR. A kick shaft 30 is rotatably supported on the transmission case 29, and a kick pedal 31 is provided at the outer end of the kick shaft 30.

Connected to a front end part of the transmission case 29 is a cooling duct 32 extending forward from the transmission case 29 so as to guide cooling air into the interior of the transmission case 29. On the other hand, air is introduced into the interior of the left rear frame pipe 16 from the outside, a front end part of the cooling duct 32 being connected to the left rear frame pipe 16.

Furthermore, disposed above the transmission case 29 on the left side of the rear wheel WR is an air cleaner 35, which is supported by the transmission case 29, and connected to the engine main body 28 is an air intake device 37 that includes the air cleaner 35 and a vaporizer 36 having its upstream end connected to the air cleaner 35. Moreover, the downstream end of an exhaust pipe 38 connected to the engine main body 28 is connected to an exhaust muffler 39 disposed on the right side of the rear wheel WR.

The link mechanism 18 includes a pair of left and right first links 41 having a front end part pivotably linked to the bracket 17 of the vehicle body frame F via a first linking shaft 40, and a pair of left and right second links 42 each having an engine suspension boss portion 42a pivotably linked to a rear end part of the first link 41 via a second linking shaft 43 and integrally linked to the transmission case 29 of the unit-swing engine UE.

A center stand 44 is pivotably supported on the second link 42 via a pivot shaft 45; this center stand 44 has a pair of left and right leg portions 44a whose extremities can be made to contact the ground and a footrest portion 44b projecting outward from the left leg portion 44a for the foot of an occupant to be rested on, and can pivot between a raised position in which the pair of left and right leg portions 44a are made to contact the ground and a retracted position in which the pair of left and right leg portions 44a are disposed along a lower face of the unit-swing engine UE (the position shown in FIG. 1 and FIG. 2), a coil-shaped elastic spring 46 urging the center stand 44 toward the retracted position being provided between the center stand 44 and a support shaft 47 provided on the left second link 42.

A rear wheel brake BR for braking the rear wheel WR is a drum brake disposed coaxially with the rear wheel WR, a brake cable 50 as a braking force-transmitting member is linked to a brake arm 49 hanging down from a rear part of a back plate 48 fixed to a rear part of the transmission case 29, and the rear wheel brake BR carries out braking due to the brake cable 50 being pulled.

The brake cable 50 is routed so as to extend forward from the brake arm 49 via the underneath of the unit-swing engine UE, and as shown in FIG. 1 a front end part of the brake cable 50 is linked to a brake lever 51 pivotably supported on a left end part of the handlebars 12.

Mounted on the left second link 42 forming part of the link mechanism 18 is a guide member 52 positioned to the rear of the engine suspension boss portion 42a. An intermediate part in the longitudinal direction of the brake cable 50 is retained by the guide member 52, and the cooling duct 32 is disposed above the guide member 52 and the brake cable 50 retained by the guide member 52 when viewed from the side.

Referring in addition to FIG. 3 to FIG. 7, with regard to the guide member 52, a wire 53 formed by bending so as to form a first insertion portion 53a through which the brake cable 50 is inserted and retained is fixed by welding to a steel plate 54 forming a support plate portion 54a abutting against an outer face of the left second link 42.

The support plate portion 54a is fixed to the left second link 42 by means of the support shaft 47. This support shaft 47 is formed so as to integrally have a threaded shaft portion 47a that is inserted into a support hole 55 provided in the support plate portion 54a and screwed into a threaded hole 56 provided in the left second link 42, a large diameter shaft portion 47c that forms between itself and the threaded shaft portion 47a an annular step portion 47b abutting against an outer face of the support plate portion 54a, is formed so as to have a larger diameter than that of the threaded shaft portion 47a, and has one end part connected coaxially to the threaded shaft portion 47a, an operating portion 47d whose outer face is formed into a polygonal shape while enabling a rotating tool to be engaged therewith and is connected to the other end of the large diameter shaft portion 47c, a neck portion 47e that has a smaller diameter than that of the operating portion 47d and is connected to an end part, on the side opposite to the large diameter shaft portion 47c, of the operating portion 47d, and a spherical portion 47f that has the neck portion 47e disposed between itself and the operating portion 47d.

Screwing the threaded shaft portion 47a into the threaded hole 56 enables the support shaft 47 to be provided on the left second link 42 and the support plate portion 54a of the guide member 52 to be held between the annular step portion 47b of the support shaft 47 and the left second link 42. Moreover, in order to prevent the steel plate 54, that is, the guide member 52, from pivoting around the axis of the support shaft 47, an engagement claw portion 54b engaging with a latching recess 57 formed in the left second link 42 is formed integrally with the steel plate 54 forming part of the guide member 52 so as to bend from an upper part of the support plate portion 54a toward the second link 42 side. Furthermore, one end part of the coil-shaped elastic spring 46 is linked to the neck portion 47e of the support shaft 47.

The wire 53 is formed so as to integrally have a mounting portion 53b that extends linearly upward to the rear and is welded to an upper part of an outer face of the support plate portion 54a, a rod-shaped extending portion 53c that extends outward from a lower end part of the mounting portion 53b, a curved portion 53d that is formed into an arc shape while having one end part connected to the rod-shaped extending portion 53c, and a bent portion 53e that bends and turns back toward the curved portion 53d side and is connected to the other end of the curved portion 53d. Moreover, as clearly shown in FIG. 6, the mounting portion 53b and the rod-shaped extending portion 53c are disposed so as to run along a first virtual plane PL1, whereas the curved portion 53d and the bent portion 53e are disposed so as to run along a second virtual plane PL2 that forms an angle a with respect to the first virtual plane PL1, the first and second virtual planes PL1 and PL2 being planes that are inclined downward to the front in a state in which the guide member 52 is mounted on the left second link 42.

Moreover, the first insertion portion 53a is formed from the curved portion 53d and part of the rod-shaped extending portion 53b of the wire 53, this first insertion portion 53a opening in the vehicle width direction as shown in FIG. 2 when viewed from the side in a state in which the guide member 52 is mounted on the left second link 42, and it is formed such that the opening area becomes a maximum in an oblique direction and a minimum when viewed from the rear.

A grommet 58, which is an elastic member, is fitted onto a portion, corresponding to the guide member 52, of the brake cable 50 so as to surround the brake cable 50, the grommet 58 being inserted through and retained by the first insertion portion 53a.

Furthermore, a second insertion portion 54c extending vertically so as to have a substantially C-shaped cross-sectional shape is formed integrally with a front part of the steel plate 54 of the guide member 52, drain tubes 59 and 60 for guiding water drained from the storage box 20 and the fuel tank 21, which are items of auxiliary equipment mounted on the motorcycle, being inserted through and retained by the second insertion portion 54c.

Referring to FIG. 2, a cable holder 63 is mounted on a lower part of the transmission case 29 by means of a pair of bolts 61 and 62, a front retaining portion 63a having a substantially U-shaped cross section opening outward is formed integrally with a front part of the cable holder 63, and a rear retaining portion 63b having a substantially U-shaped cross section opening upward is formed integrally with a rear part of the cable holder 63. The brake cable 50, which extends in the fore-and-aft direction beneath the transmission case 29, is fitted into each of the front retaining portion 63a and the rear retaining portion 63b, and a retaining arm 64 having one end part abutting against the brake cable 50 within the front retaining portion 63a has the other end part secured to the cable holder 63 by means of a screw member 65.

The operation of the embodiment is now explained; since the link mechanism 18 provided between the front part of the unit-swing engine UE and the vehicle body frame F has the first link 41 linked to the vehicle body frame F and the second link 42 linked to the unit-swing engine UE while having the engine suspension boss portion 42a pivotably linked to the first link 41, and the guide member 52 retaining the brake cable 50 extending in the fore-and-aft direction beneath the unit-swing engine UE is mounted on the second link 42, it is possible to dispose the guide member 52 in the vicinity of the engine suspension boss portion 42a, which is the anchor point for swinging of the unit-swing engine UE, thus enabling swinging of the brake cable 50 linked to the rear wheel brake BR coaxial with the rear wheel WR to be kept low and components around the brake cable 50 to be disposed closer to the brake cable 50 thereby enabling concentration of the mass around the brake cable 50 to be achieved.

Furthermore, since the center stand 44 is pivotably supported on the second link 42, and the elastic spring 46 urging the center stand 44 toward the retracted position side is provided between the center stand 44 and the support shaft 47 provided on the second link 42 so as to support the guide member 52, it is possible to dispose the center stand 44 closer to the brake cable 50, thereby enabling further concentration of the mass to be achieved. This mass concentration enables the second link 42 to be made small, thus enabling the weight of the motorcycle to be reduced and also enabling the unit-swing engine UE to be disposed at a lower position, and as a result the center of gravity of the motorcycle to be lowered.

Moreover, since the unit-swing engine UE includes the engine main body 28 and the transmission case 29 connectedly provided on the engine main body 28 and extending rearward, and the cooling duct 32 introducing cooling air into the interior of the transmission case 29 is disposed above the guide member 52 and the brake cable 50 retained by the guide member 52 when viewed from the side, it is possible to avoid passage of the brake cable 50 through the side of the cooling duct 32 and enable the brake cable 50 to be present beneath the cooling duct 32 when viewed from the side, thus enabling further concentration of mass to be achieved and the brake cable 50 to be shortened.

Furthermore, since the guide member 52 is formed so as to include the first insertion portion 53a, through which the brake cable 50 is inserted and retained, and the second insertion portion 54c, through which the drain tubes 59 and 60 for guiding water drained from the storage box 20 and the fuel tank 21, which are items of auxiliary equipment mounted on the motorcycle, are inserted and retained, it is unnecessary to employ a member exclusively used for retaining the drain tubes 59 and 60, thus avoiding any increase in the number of components and achieving further concentration of mass.

Moreover, since in a state in which the guide member 52 is mounted on the second link 42, the first insertion portion 53a opens in the vehicle width direction when viewed from the side, and it is formed so that the opening area is a maximum in an oblique direction and a minimum when viewed from the rear, while enabling the brake cable 50 to be inserted through the first insertion portion 53a in a state in which an elastic member such as the grommet 58 is fitted with the brake cable 50, it is possible to insert and retain the brake cable 50 through the first insertion portion 53a together with the grommet 58 in a state in which the guide member 52 is mounted on the second link 42 due to the opening area of the first insertion portion 53a being a minimum when viewed from the rear in a state in which the guide member 52 is mounted on the second link 42, thereby enhancing the efficiency of the mounting operation.

Furthermore, the brake cable 50 is retained by use of the guide member 52 of the present invention, which is not a conventional guide member having a hook shape formed by cutting out part of a circle, and it is thus possible to make it difficult for the brake cable 50 to interfere with another component when carrying out insertion and retention of the brake cable 50 through the guide member 52.

An embodiment of the present invention is explained above, but the present invention is not limited to the above embodiment and may be modified in a variety of ways as long as the modifications do not depart from the spirit and scope thereof.

For example, in the above embodiment, the brake cable 50 is explained as a braking force-transmitting member, but the present invention may be implemented using as a braking force-transmitting member a brake hose that guides fluid pressure to a rear wheel brake when the rear wheel brake is a disk brake that is operated by fluid pressure.

Furthermore, in the above embodiment, the two drain tubes 59 and 60 are inserted through the second insertion portion 54c of the guide member 52, but the number of drain tubes that are inserted through the second insertion portion 54c is not limited to two, and may be one or a plurality of three or more.

Moreover, in the above embodiment, the storage box 20 and the fuel tank 21 are items of auxiliary equipment, but the present invention may be implemented using as auxiliary equipment an air cleaner box, a carburetor, etc. requiring a drain tube.

Furthermore, it is also possible to utilize the guide member of the present invention as one that retains various types of piping members used for a throttle, a clutch, etc.

The invention claimed is:
1. A routing structure for a braking force-transmitting member in a motorcycle in which a unit-swing engine extending in a fore-and-aft direction so as to axially support a rear wheel via a rear part thereof has a front part swingably supported on a vehicle body frame via a link mechanism, and the braking force-transmitting member for transmitting a braking force to a rear wheel brake disposed coaxially with the rear wheel so as to brake the rear wheel is routed so as to extend in the fore-and-aft direction, wherein the link mechanism comprises a first link linked to the vehicle body frame and a second link linked to the unit-swing engine while having an engine suspension boss portion pivotably linked to the first link, and a guide member retaining the braking force-transmitting member extending in the fore-and-aft direction beneath the unit-swing engine is mounted on the second link, a center stand is pivotably supported on the second link, and an elastic spring urging the center stand toward a retracted position side is provided between the center stand and a support shaft provided on the second link so as to support the guide member.

2. The routing structure for the braking force-transmitting member in the motorcycle according to claim 1, wherein the unit-swing engine comprises an engine main body and a transmission case provided so as to be connected to the engine main body and extending rearward, and a cooling duct for introducing cooling air into an interior of the transmission case is disposed above the guide member and the braking force-transmitting member retained by the guide member when viewed from a side.

3. The routing structure for the braking force-transmitting member in the motorcycle according to claim 2, wherein the guide member is formed so as to comprise a first insertion portion through which the braking force-transmitting member is inserted and retained and a second insertion portion through which a drain tube is inserted and retained, the drain tube guiding water drained from auxiliary equipment mounted on the motorcycle.

4. The routing structure for the braking force-transmitting member in the motorcycle according to claim 1, wherein the guide member is formed so as to comprise a first insertion portion through which the braking force-transmitting member is inserted and retained and a second insertion portion through which a drain tube is inserted and retained, the drain tube guiding water drained from auxiliary equipment mounted on the motorcycle.

5. The routing structure for the braking force-transmitting member in the motorcycle according to claim 4, wherein the first insertion portion is formed so as to open in a vehicle width direction when viewed from the side in a state in which the guide member is mounted on the second link and so that an opening area thereof is a maximum in an oblique direction and a minimum when viewed from a rear.

* * * * *